United States Patent Office 3,594,334
Patented July 20, 1971

3,594,334
SURFACTANT MIXTURES FOR FLEXIBLE
POLYESTER URETHANE FOAMS
Lawrence Marlin, Yorktown Heights, N.Y., assignor to
Union Carbide Corporation
No Drawing. Continuation-in-part of abandoned application Ser. No. 493,529, Oct. 6, 1965. This application
Dec. 7, 1967, Ser. No. 688,702
Int. Cl. B01f 17/54; C08g 22/46
U.S. Cl. 260—2.5                                19 Claims

ABSTRACT OF THE DISCLOSURE

This invention relates to the use of novel combinations of foam stabilizing surfactants in the production of flexible polyester urethane foams. The novel foam stabilizer combinations consist of (a) an anionic organic surfactant that is soluble in the polyester reactant at room temperature and that is capable of lowering the surface tension of the polyester resin reactant when dissolved therein and, (b) a siloxane-polyoxyalkylene block copolymer surfactant that has a critical molecular weight, siloxane content and oxyethylene content. The novel surfactant combinations allow for the production of flexible polyester urethane foams having fine, uniform cell structure, low compression set and freedom from large voids and splits.

This application is a continuation-in-part of application No. 493,529, filed Oct. 6, 1965, now abandoned.

Flexible polyester urethane foams are conventionally produced by reacting a polyester containing hydroxyl group and polyisocyanates in the presence of blowing agents, amine catalysts and organic surfactants (e.g., amides and sulfates of esters). The surfactants are called "emulsifiers" and serve to stabilize the foam. By such processes it is difficult to produce relatively low density foams (e.g., foams having densities less than about 2.0 pounds per cubic foot) or high density foams (e.g., foams having densities greater than about 4.0 pounds per cubic foot) which possess fine uniform cell structure. In addition it is difficult to produce high density foams without undesirable shrinkage of the foam. These difficulties in producing low and high density foams appear to be attributable, at least in part, to the emulsifiers employed.

Further difficulties encountered in the production of flexible polyester urethane foams by conventional means derive from the fact that the foams are very sensitive to stress during production. As a result, if the foams are accidentally subjected to stress (e.g., by being jarred while in the conveyor belts usually used to transport the foam "buns" during production), splits occur in the foam, especially on the sides of the bun.

To the extent that the above difficulties in producing flexible polyester urethane foams are attributable to the organic surfactants (emulsifiers) employed, it might appear that at least some of the difficulties might be overcome by substituting siloxane-oxyalkylene block copolymers for the organic surfactants. Such a substitution would seem to be feasible since these block copolymers have been used as foam stabilizers with satisfactory results in the production of other types of urethane foams (e.g., in the production of polyether urethane foams and certain rigid polyester urethane foams). However, as far as it is known, the mere substitution of various siloxane-oxyalkylene copolymers for organic surfactants in conventional reaction mixtures used to produce flexible polyester urethane foams has not been commercially successful since completely satisfactory foams have not been produced thereby (e.g., the foams have high compression sets).

This invention is based, in part, on the discovery that the above-described difficulties in producing flexible polyester urethane foams can be overcome by employing, in combination, certain anionic organic surfactants (preferably sulfonic acids or sulfonic acid salts) and certain siloxane-polyoxyalkylene block copolymers as foam stabilizers during the production of the foams. More particularly, this invention provides a process for producing a flexible polyester urethane foam, said process comprising foaming and reacting, in a single step, a reaction mixture comprising:

(I) A polyester resin having an average of at least two hydroxyl groups per molecule and having a hydroxyl number of from 45 to 150;

(II) A polyisocyanate, said polyester and said polyisocyanate, taken together, being present in the mixture in a major amount and in the relative amount required to produce the urethane;

(III) A blowing agent in a minor amount sufficient to foam the reaction mixture;

(IV) A catalytic amount of a catalyst for the production of the urethane from the polyester and the polyisocyanate;

(V) A minor amount of an anionic organic surfactant stabilizer for the foam which is soluble in said polyester resin at room temperature and which is capable of lowering the surface tension of said polyester resin at least 5 dynes per centimeter when dissolved therein and;

(VI) A minor amount of siloxane-polyoxyalkylene block copolymer surfactant stabilizer for the foam having molecular weight from 600 to 17,000, a siloxane content from 14 to 40 weight percent based on the weight of the copolymer and an oxyethylene content of at least 75 weight percent based on the total amount of oxyalkylene groups in the copolymer.

The anionic organic surfactants employed in this invention are soluble in the polyester resin at room temperature and are capable of lowering the surface tension of the polyester resin at least 5 dyes per centimeter when dissolved in the resin. Preferably, the organic surfactant is soluble in the polyester resin at room temperature to the extent of at least 0.1 part by weight per 100 parts by weight of the resin (more desirably to the extent of at least 0.3 part by weight per 100 parts by weight of the resin). Such surfactants are generally even more soluble in the polyester resin at elevated temperatures. Preferably the organic surfactant is capable of lowering the surface tension of the polyester resin at least 10 dynes per centimeter when dissolved in the resin. When certain compounds that are insoluble in polyester resins are mixed with the resins, they may float on the surface thereof and produce an apparent lowering of the surface tension of the resin. Such compounds are not useful in this invention which requires surfactants that dissolve in the resin and, in the dissolved state, exert a true surface tension lowering effect. It should be recognized that anionic organic surfactants useful in this invention may not lower the surface tension of the polyester resin at least 5 dynes per centimeter at all concentrations when dissolved in the resin. In fact, a surfactant that lowers the surface tension of the resin by the above stated amount even at only one concentration between a 0.1 wt.-percent concentration and the maximum solubility concentration of the surfactant in the resin will possess the desired surface active properties to be useful in this invention.

The anionic organic surfactants employed in this invention are organic compounds whose molecules have at least one hydrophobic portion and at least one hydrophilic portion. The hydrophobic portions of these compounds are hydrocarbon, hydrocarbon ester or hydrocarbon ether groups that contain, for example, at least about 10 or 18 aliphatic and/or aromatic carbon atoms while the hydrophilic portions of these compounds are polar groups (e.g., ammonium alkali metal sulfate or sulfonate, sulfonic acid, phosphate, persulfate, thiosulfate and sulfonamido groups). Suitable organic surfactants can contain sulfate or sulfonate groups or can be free of such groups. The surfactants can be water-soluble or water-insoluble. Thus the anionic organic surfactants employed in this invention include sulfates, alkane, sulfonic acids, alkyl aromatic sulfonic acids, phosphates, persulfates, thiosulfates, sulfonamides and sulfamic acids. Illustrative of more specific types of organic surfactants employed in this invention are organic phosphate esters, alkali metal salts of polyoxyethylenate alkylphenols and alkyl naphthylene alkali metal sulfonates. Suitable surfactants are sold under the names "Gafac PE–510," "Witco Fomrez 77–86," "Emcol H–77," "Gafac LO–529," and "Petro AA."

The anionic surfactants employed in this invention are foam stabilizers for flexible polyester urethane foams and some are used commercially for that purpose.

Preferred anionic organic surfactants employed in this invention are the liquid, water-soluble and water-insoluble organic compounds having at least 18 carbon atoms and at least one carbon-bonded sulfonic acid group represented by the formula:

$$-SO_3H$$

or at least one ammonium, alkali metal or alkaline earth metal salt groups derived from said sulfonic acid group. The sulfonic acid groups or salt derivatives thereof can be substituents on any of a wide variety of "backbone" organic compounds provided such compounds have at least 18 carbon atoms and are water-insoluble liquids. Preferably, such groups are substituents on hydrocarbons (on a mixture of hydrocarbons), fatty acid esters or hydrocarbons having poly(alkylene oxide) substituents. The sulfonic surfactants can have viscosities up to about 1,400 SUS at 210° F. or higher. In addition to the sulfonic acid group or salt derivative thereof, the sulfonic surfactants preferably contain no elements other than carbon, hydrogen and optionally, oxygen and any such oxygen is preferably present in an ether linkage or in a carboxylic acid ester group. The sulfonic acid group or salt derivative thereof increases the water solubility of the parent organic liquid. In some cases both parent organic liquids and their sulfonic surfactant derivatives are substantially water-insoluble (i.e., the surfactant is soluble to the extent of no more than 1.0 par by weight or no more than 0.5 part by weight per 100 parts by weight of water). These water-insoluble surfactants are preferably readily emulsifiable in water.

Particularly preferred anionic surfactants are liquid, water-insoluble or water-soluble materials having the formula:

$$[R°SO_3]_mM \qquad (1a)$$

wherein R° is a monovalent hydrocarbon group having at least 11 or 18 carbon atoms, M is a cation selected from the group consisting of the hydrogen, $NR°°_4$, alkali metal and alkaline earth metal cations, R°° is hydrogen or a monovalent hydrocarbon group, and $m$ is the valence of the cation represented by M. Illustrative of the monovalent hydrocarbon groups represented by R°° in Formula 1a are the alkyl group (e.g., the methyl, ethyl, propyl and butyl group) and the aryl group (e.g., the phenyl and naphthyl groups).

The sulfonic surfactants represented by Formula 1a include hydrocarbyl sulfonic acids and the ammonium, quaternary ammonium alkali metal and alkaline earth metal salts thereof. Illustrative of the groups represented by R° in Formula 1a are the alkyl groups, the aryl groups, anthracyl groups, the alkaryl (e.g., the dodecyl phenyl groups), and the aralkyl groups. Illustrative of the cations represented by M in Formula 1a are the hydrogen, $NH_4$, $NH_3Me$, $NH_2(C_2H_3)_2$, $NH(C_4H_9)_3$, $NH(C_2H_5)_3$, $NMe_4$, Na, K, Ca and Sr cations. Suitable sulfonic surfactants include discrete compounds and also complex mixtures such as are produced by sulfonating hydrocarbon oils (e.g., petroleum oils). Surfactants of the latter type are described in "Bryton Sulfonates," 1962, Bryton Chemical Company, 50–BR4–762.

Sulfonic surfactants represented by Formula 1a above include those represented by the formula:

$$alkyl—Ar—SO_3NR°°_4 \qquad (1b)$$

wherein "alkyl" represents an alkyl group having at least 11 carbon atoms (e.g., undecyl, dodecyl, octadecyl, etc.), Ar is an arylene group (e.g., phenylene or naphthylene) and R°° has the above defined meaning.

The anionic organic surfactant is preferably employed in this invention in an amount of from 0.07 to 0.30 part by weight per 100 parts by weight of the reaction mixture used in producing the foam. It is desirable that the concentration of the organic surfactant should not exceed the solubility concentration of the surfactant in the polyester resin as some defoaming may be caused by the insoluble portion of the surfactant.

As indicated above, the siloxane-oxyalkylene block copolymers employed as surfactants in this invention are characterized by certain molecular weights, siloxane contents and oxyethylene contents. Provided that the copolymers conform to these limitations, they may have any of a wide variety of structures and substituents and still be effective in this invention. Subject to this qualification, a more detailed description of some of the various classes of useful siloxane-oxyalkylene block copolymers is presented below.

Included among the siloxane-oxyalkylene copolymers that are useful in this invention are those copolymers having siloxane portions (or "blocks") composed of siloxane groups that are represented by the formula:

$$\frac{R_bSiO_{4-b}}{2} \qquad (1)$$

wherein R is a monovalent hydrocarbon group or a divalent organic group and $b$ has a value from 1 to 3 inclusive. Each divalent organic group represented by R links a siloxane portion of the copolymer to an oxyalkylene portion of the copolymer. The groups represented by R can be the same or different in any given siloxane group or throughout the siloxane portion or block of the copolymer, and the value of $b$ in the various siloxane groups in the siloxane portion of the copolymer can be the same or different. Each siloxane portion of the copolymer contains at least one group represented by Formula 1 wherein at least one group represented by R is a divalent organic group.

Illustrative of the monovalent hydrocarbon groups that are represented by R in Formula 1 are the alkyl groups (for example, the methyl, ethyl, isopropyl, octyl, and dodecyl groups), the alkenyl groups (for example, the vinyl and the allyl group); the cycloalkenyl groups (for example, the cyclohexenyl group); the aryl groups (for example, the phenyl and naphthyl groups); the aralkyl groups (for example, the benzyl and the phenylethyl groups); the alkaryl groups (for example, the tolyl. and n-hexylphenyl groups); and the cycloalkyl groups (for example, the cyclohexyl group). If desired such groups can contain substituents such as halogens and the like.

The structure of the divalent organic group represented by R in Formula 1 is dependent upon the type of reaction involved in producing the siloxane-oxyalkylene copolymer. Such copolymers can be produced by any number of reactions thereby giving rise to a variety of divalent organic groups linking the siloxane portion to the oxyalkylene portion of the copolymer. Typical of such reactions are the following:

(a) $\equiv SiOR^3 + HOC \longrightarrow \equiv SiOC\equiv + R^3OH$ (b) $\equiv SiO\overset{O}{\underset{\|}{C}}-R^3 + HOC \longrightarrow \equiv SiOC\equiv + HO\overset{O}{\underset{\|}{C}}-R^3$ (c) $\equiv SiH + HOC\equiv \longrightarrow \equiv SiOC\equiv + H_2$ (d) $\equiv SiX + HOC\equiv \longrightarrow \equiv SiOC\equiv + HX$ (e) $\equiv$SiOH + HOC$\equiv$ $\longrightarrow$ $\equiv$SiOC$\equiv$ + H$_2$O (f) $\equiv$Si(CH$_2$)$_3$OCH$_2$CH$\overset{O}{\overset{\diagup \diagdown}{\text{—}}}$CH$_2$ + HOC$\equiv$ $\longrightarrow$
$\equiv$Si(CH$_2$)$_3$OCH$_2$CH(OH)CH$_2$OC$\equiv$ (g) $\equiv$SiCH=CH$_2$ + HOC$\equiv$ $\longrightarrow$ $\equiv$SiCH$_2$CH$_2$C—
$\phantom{\equiv\text{SiCH=CH}_2 + \text{HOC}\equiv \longrightarrow \equiv\text{SiCH}_2\text{CH}_2\text{C}}$OH (h) $\equiv$SiH + CH$_2$=CHCH$_2$OC$\equiv$ $\longrightarrow$ $\equiv$Si(CH$_2$)$_3$OC$\equiv$ (i) $\equiv$SiRHal + MOC$\equiv$ $\longrightarrow$ $\equiv$SiROC$\equiv$ + MHal In the above Equations $a$ to $i$, R$^3$ represents a monovalent alkyl or aryl group, X represents a halogen atom or amino group, such as NH$_2$, NHR$^2$ and NR$_2$$^2$ wherein R$^2$ is a monovalent hydrocarbon radical, Hal represents a halogen, i.e., bromine, chlorine, fluorine, or iodine, M is an alkali metal such as sodium or potassium, and R is a divalent hydrocarbon radical, preferably a saturated aliphatic radical such as ethylene, propylene, n-butylene, isoamylene, hexamethylene and the like. In the Equations $a$ through $i$ the Si-containing group on the far left represents the reactive portion of the siloxane while the HOC$\equiv$ group represents a hydroxyl reactive portion of the organic polyol. In Equations $h$ and $i$ the Si-containing group on the far left represents the reactive portion of the siloxane and the CH$_2$=CHCH$_2$OC$\equiv$ and MOC$\equiv$ groups represent polyols in which some of the hydroxyl groups have been replaced by allyloxy and metaloxy groups respectively in order to provide groups reactive with $\equiv$SiH and $\equiv$SiR Hal respectively.

Illustrative of the divalent hydrocarbon groups represented by R in Formula 1 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulae:

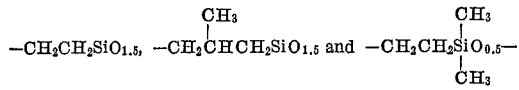

These divalent hydrocarbon groups are linked to a silicon atom of the siloxane chain or block of the copolymer by a silicon-to-carbon bond and to an oxygen atom of the oxyalkylene chain of the copolymer by a carbon-to-oxygen bond. Other divalent organic groups represented by R in Formula 1 are described herein below.

The block copolymers useful as surfactants in this invention can contain siloxane groups represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups). These copolymers can contain one or more types of siloxane groups that are represented by Formula 1 provided that at least one group has at least one divalent hydrocabon substituent. By way of illustration, only ethylenemethylsiloxy groups

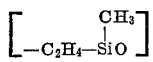

can be present in the siloxane block or the copolymer can contain more than one type of siloxane group, e.g., the copolymer can contain both ethylenemethylsiloxy groups and diphenylsiloxy groups, or the copolymer can contain ethylenemethylsiloxy groups, diphenylsiloxy groups and the diethylsiloxy groups. The copolymers useful in this invention can contain trifunctional siloxane groups (e.g., monomethylsiloxane groups, CH$_3$SiO$_{1.5}$), difunctional siloxane groups (e.g., dimethylsiloxane groups, (CH$_3$)$_2$SiO—)

monofunctional siloxane groups e.g., trimethylsiloxane groups, (CH$_3$)$_3$SiO$_{0.5}$), or combination of these types of siloxane groups having the same or different substituents. Due to the functionality of the siloxane groups, the copolymer can be predominantly linear or cyclic or cross-linked or it can have combinations of these structures.

The siloxane portion of the block copolymers useful as surfactants in this invention can contain organic end-blocking or chain terminating organic groups, in addition to the monofunctional siloxane chain terminating groups encompassed by Formula 1. By way of illustration, the siloxane portion can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like.

The siloxane portion of the block copolymers useful in this invention can contain, in addition to the groups represented by Formula 1, siloxane groups represented by the formula:

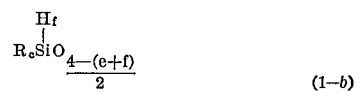  (1–b)

wherein R has the meaning defined in Formula 1, $e$ has a value from 0 to 2, $f$ has a value from 1 to 2 and $(e+f)$ has a value from 1 to 3, inclusive.

The oxyalkylene portions or "blocks" of the siloxane-oxyalkylene block copolymers employed as surfactants in this invention are composed of oxyalkylene groups represented by the formula:

  (2)

wherein R' is an alkylene group, provided that at least 75 weight-percent of the oxyalkylene groups are oxyethylene groups. Preferably each oxyalkylene block contains at least four oxyalkylene groups. Illustrative of the oxyalkylene groups that are represented by Formula 2 are the oxyethylene, oxypropylene, oxy-1,4-butylene, oxy-1,5-amylene, oxy-2,2-dimethyl-1,3-propylene, oxy-110-decylene groups and the like. The oxyalkylene portion of the copolymers can contain more than one of the various types of oxyalkylene groups represented by Formula 2 provided that at least 75 weight-percent of the oxyalkylene groups are oxyethylene groups. By way of illustration, the oxyalkylene blocks can contain only oxyethylene groups or both oxyethylene and oxypropylene groups, or other combinations of oxyethylene groups and the various other types of oxyalkylene groups represented by Formula 2.

The oxyalkylene portion of the block copolymers empolyed in this invention can contain various organic end-blocking or chain terminating groups. By way of illustration, the oxyalkylene blocks can contain such end-blocking groups as the hydroxy groups, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene chain. For example the glyceroxy group,

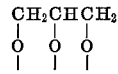

can serve as an end-blocking group for three oxyalkylene chains. Trihydrocarbylsiloxy groups (e.g., trimethylsiloxy groups) can also end-block the oxyalkylene chains.

The following classes of compounds are among the siloxane-oxyalkylene block copolymers useful in this invention.

(A) Copolymers that contain at least one unit that is represented by the formula:

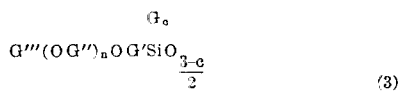

(3)

(B) Copolymers that contain at least one unit that is represented by the formula:

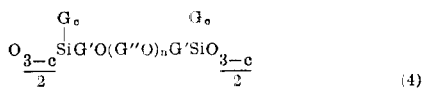

(4)

(C) Copolymers that contain at least one unit that is represented by the formula:

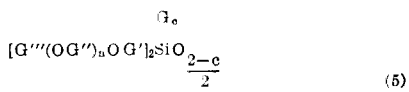

(5)

In the above Formulas 3, 4 and 5, G is a monovalent, hydrocarbon radical, G' is a divalent hydrocarbon radical, G'' is an alkylene radical containing at least two carbon atoms, G''' is a hydrogen atom or a monovalent hydrocarbon radical free of aliphatic unsaturation and $n$ has a value of at least four and $c$ has a value from 0 to 2 in Formulas 3 and 4 and a value from 0 to 1 in Formula 5. In Formulas 3, 4 and 5, G can represent the same or different radicals, $n$ preferably has a value from 4 to 30 inclusive and G'' can represent the same or different radicals, i.e., the group $(OG'')_n$ can represent, for example, the groups: $-(OC_2H_4)_p-$, $-(OC_2H_4)_p(OC_3H_6)_q-$, $-(OC_2H_4)_p(OC_8H_{16})_q-$, where $p$ and $q$ are integers.

The monovalent hydrocarbon radicals represented by G and G''' in Formulas 3, 4 and 5 can be any of the monovalent hydrocarbon groups included above in the definition of R for Formula 1. The divalent hydrocarbon radicals represented by G' in Formulas 3, 4 and 5 can be any of the divalent hydrocarbon groups included above in the definition of R for Formula 1. Illustrative of the alkylene radicals containing at least two carbon atoms represented by G'' in Formulas 3, 4 and 5 are the ethylene, 1,2-propylene, 1,3-propylene, 1,6-hexylene, 2-ethylhexylene 1,6- and 1,12-dodecylene radicals.

A preferred class of siloxane-oxyalkylene copolymers that are useful in this invention are those which are composed both groups represented by the Formulas 3, 4 or 5 and groups represented by the formula:

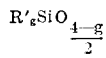

wherein R' is a monovalent hydrocarbon group as defined above for R in Formula 1 and $g$ has a value from 1 to 3 inclusive.

Siloxane-oxyalkylene block copolymers that are especially suited for use as surfactants in this invention are those having the formula:

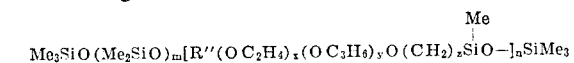

wherein $m$ has a value from 0 to 20 inclusive, $n$ has a value from 1 to 10 inclusive, $x$ has a value from of at least 4, $y$ has a value from 0 to 6 inclusive, $z$ has a value from 2 to 3 inclusive and R'' is an alkyl group containing from 1 to 4 carbon atoms inclusive and "Me" is a methyl group ($CH_3$).

Another class of siloxane-oxyalkylene block copolymers that are useful in this invention are those represented by the formula:

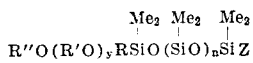

In this latter formula, R'' is a hydrogen atom or a hydrocarbyl, hydrocarbonoxy, acyl, trihydrocarbylsilyl or monovalent hydrocarbon carbamyl radical; R' is an alkylene radical 2; $y$ is a whole number; R is a divalent non-aromatic hydrocarbon radical, divalent non-aromatic hy- droxy-substituted hydrocarbon radical, divalent non-aromatic acyl radical derived from a monocarboxylic acid or a divalent non-aromatic hydroxy ether radical; R is connected to the silicon via a silicon-carbon bond; $n$ is equal to 0 or a positive whole number; and Z is a hydrocarbyl radical, a hydrocarbonoxy radical (i.e., $R(OR')_yOR''$ in which R, R', $y$ and R'' are as defined above) or of a radical of the formula $-ASiB_3$ in which A is a divalent hydrocarbon radical and B is a hydrocarbyl or a trihydrocarbylsiloxy radical.

A further class of siloxane-oxyalkylene block copolymers that are useful in this invention are those containing the group represented by the formula:

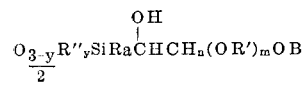

wherein R' is a hydrogen atom or a monovalent hydrocarbonoxy radical, monovalent hydrocarbon radical, monovalent halohydrocarbon radical or a monovalent halohydrocarbonoxy radical; $y$ has a value from 0 to 3; R is a divalent radical attached to the silicon through a salicon-carbon bond (e.g., a divalent hydrocarbon radical, divalent halohydrocarbon radical or a divalent radical composed of carbon, hydrogen and oxygen in the form of ether linkages); $n$ is 1 or 2, $n$ being 1 when the C of the $CH_n$ group is linked directly to R in a cycloaliphatic ring; R' is an alkylene group, $m$ is an integer of at least 1; and B is a hydrogen atom or a monovalent hydrocarbon radical, a monovalent hydrocarbonoxy radical or a monovalent halohydrocarbon radical.

Another class of siloxane-oxyalkylene block copolymers useful in this invention are those wherein the siloxane moiety is linked to an oxyalkylene moiety by a divalent group composed of a divalent hydrocarbon group linked to a carbonyl group. Such copolymers are illustrated by those containing a unit having the formula:

where R is a monovalent hydrocarbon radical or a halogenated monovalent hydrocarbon radical, (a) is an integer and (b) is an integer of from 0 to 2. The unsatisfied valence of the acyl carbon atom ($-CO-$) is attached through an oxygen linkage to a polyoxyalkylene chain.

Yet another class of siloxane-oxyalkylene block copolymers that are useful in this invention are those wherein the siloxane moiety is linked to the oxyalkylene moiety by a group composed of a divalent hydrocarbon group attached to an oxygen atom (e.g., the $-CH_2CH_2-O-$ group). In such groups the oxygen atom is attached to a silicon atom of the siloxane moiety. Since the carbon-to-oxygen-to-silicon bonds provided by such divalent organic groups are hydrolysable, this variety of copolymer is commonly called "hydrolyzable copolymers." The siloxane block or moiety of such copolymers can consist solely of monohydrocarbonsiloxane units ($RSiO_{1.5}$) or it can consist solely of dihydrocarbonsiloxane units ($R_2SiO$) or it can consist of mixtures of such siloxane units and, if desired, trihydrocarbonsiloxane units ($R_3SiO_{0.5}$) as well. Accordingly, one class of these copolymers can be represented by the formula:

where $y$ is an integer having a value of at least 2 and denotes the number of siloxane units, $n$ is an integer denoting the number of carbon atoms in the oxyalkylene group, $x$ is an integer and denotes the length of the oxyalkylene group, $x$ is an integer and denotes the length of the oxyalkylene chain, and $a$ and $b$ are integers whose sum is 2 or 3. Another class of these copolymers can be represented by the formula:

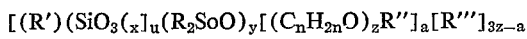

where $x$ is an integer and represents the number of trifunctional silicon atoms bonded to a single monovalent or multivalent hydrocarbon radical, $R'$; $a$ is an integer and represents the number of polyoxyalkylene chains in the block copolymer; $y$ is an integer, $u$ has a value of at least 1, and denotes the number of difunctional siloxane units, $n$ is an integer denoting the number of carbon atoms in the oxyalkylene group; and $z$ is an integer and denotes the length of the oxyalkylene chain.

Other siloxane-oxyalkylene block copolymers useful in this invention are those having a siloxane portion grafted to an oxyalkylene portion. Suitable graft copolymers include those produced by reacting a siloxane having an olefinically unsaturated group and an oxyalkylene polymer in the presence of a catalyst that is a free radical generator. The latter copolymers can be described as a graft copolymer of a polyoxyalkylene polymer which copolymer is a polyoxyalkylene molecule having the general formula:

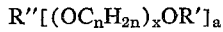

wherein $R'$ is hydrogen, an acyl radical or a monovalent hydrocarbon radical, $R''$ is hydrogen or a monovalent hydrocarbon radical, a divalent hydrocarbon radical or a polyvalent hydrocarbon radical, $a$ is an integer having a value equal to the valence of $R''$, $n$ in each occurrence an integer having a value of from 2 to 4 inclusive, $x$ is in each occurrence an integer, said polyoxyalkylene molecule having attached thereto side chains of a polysiloxane, said side chains being attached to said polyoxylalkylene through a carbon-to-carbon bond in which one carbon atom of said bond is a carbon atom of an $(OC_nH_{2n})$ unit of said polyoxyalkylene molecule and in which the other carbon atom of said bond is linked to a silicon atom of the polysiloxane through at least one carbon atom.

Various of the above-described classes of siloxane-oxyalkylene copolymers are described in U.S. Pats. 2,834,748, 2,846,458, 2,868,824, 2,917,480 and 3,057,901, in Belgian Pat. No. 603,552 and in U.S. patent application 61,356 filed Oct. 10, 1960.

The siloxane-oxyalkylene block copolymers are preferably employed in this invention in amounts of from 0.15 to 4.0 parts by weight per 100 parts by weight of the total weight of the polyester and the polyisocyanate. The block copolymers preferably have molecular weights from 3,000 to 4,000, siloxane contents from 23 to 27 weight percent and an oxyethylene content of 100% based on the total amount of oxyalkylene groups in the copolymer (i.e., preferably all the oxyalkylene groups are oxyethylene groups). Within the general and preferred ranges of molecular weights and siloxane contents given above, it is desirable that the higher molecular weight copolymers have the lower siloxane contents. By "siloxane content" as used herein is meant the weight percent of the siloxane portion of the copolymer (e.g., the weight percent attributable to groups represented by Formula 1).

The catalysts employed in this invention include the conventional catalysts used in producing flexible polyester urethane foams. Such conventional catalysts include N-methyl morpholine, N-ethyl morpholine, hexadecyl dimethylamine, di-methyl benzyl amine, and N-cocomorpholine and the like. Such catalysts are preferably employed in the mixtures in an amount from 0.1 to 0.5 or 2 weight percent based on the total weight of the polyester and the polyisocyanate. Amines are the preferred catalysts.

The polyesters employed in this invention are the reaction products of polyfunctional organic carboxylic acids and polyhydric alcohols. The polyesters contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 45 to 150 but preferably have hydroxyl numbers from 45 to 65. These hydroxyl numbers are readily determined according to the procedure described by Mitchel et al., Organic Analysis, Volume I, Interscience, New York, 1953. The polyesters can be free of aliphatic carbon to carbon multiple bonds (i.e., olefinic double bonds or acetylenic triple bonds).

Typical of the polyfunctional organic carboxylic acids that can be employed in producing polyesters useful in this invention are dicarboxylic aliphatic acids such as succinic, adipic, sebacic, azelaic, glutaric, pimelic and suberic acids and aromatic dicarboxylic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyesters.

Typical of the polyhydric alcohols ("polyols") that can be employed in producing the polyesters useful in this invention are both the monomeric polyhydric alcohols (such as glycerol, 1,2,6-hexanetriol, ethylene glycol, trimethylol propane, trimethylolethane, pentaerylthritol, propylene glycol, 1,3-butylene glycol and 1,4-butylene glycol) and the polymeric polyhydric alcohols such as those described below.

The polymeric polyhydric alcohols employed in producing the polyesters used in this invention include the linear and branched chain polyethers which have a plurality of acyclic ether oxygens and contain at least two alcoholic hydroxyl radicals. Illustrative polyethers include the polyoxyalkylene polyols containing one or more chains of connected oxylakylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide polyethers that are useful in producing polyesters used in this invention include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside and rhamnoside, and polyethers prepared by the reaction of alkylene oxides with sucrose.

Further polyethers that are useful in producing polyesters that can be used in this invention are prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6-di-t.-butylcatechol or catechol. Other polyethers which can be employed in producing polyesters that can be used in this invention are those obtained by reacting 1,2-alkylene oxides or mixtures thereof with polynuclear hydroxybenzenes such as the various di, tri- and tetraphenylol compounds in which two to four hydroxybenzene groups are attached by means of single bonds or by an aliphatic hydrocarbon radical containing one to twelve carbon atoms.

The term "polynuclear" as distinguished from "mononuclear" is used to designate at least two benzene nuclei in a compound. Exemplary diphenylol compounds include 2,2-bis(p-hydroxyphenyl)-propane; bis(p-hydroxyphenyl)-methane and the various diphenols and diphenol methanes disclosed in U.S. Pats. Nos. 2,506,486 and 2,744,882, respectively. Tetraphenylol compounds can also be reacted with 1,2-alkylene oxides to produce polyethers that are useful in producing polyesters that can be used in this invention. Other polyethers which can be employed in producing polyesters that can be used in this invention are the ethylene oxide, propylene oxide and butylene oxide adducts of phenol-formaldehyde condensation product materials such as the novolaks.

A variety of organic polyisocyanates can be employed in this invention for reaction with the polyesters above described to provide flexible polyester urethane foams. Preferred are polyisocyanates having the general formula:

$$Q(NCO)_i$$

wherein $i$ is an integer of two or more and Q is an organic radical having the valence of $i$. Q can be a substituted or unsubstituted hydrocarbon group (e.g., an alkylene or an arylene group). Q can be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diisocyanate, 1,8-diisocyanato, p-methyl xylylene diisocyanate, $$(OCNCH_2CH_2CH_2OCH_2)_2$$

1-methyl-2,4-diisocyanatocyclohexane, phenylene diisocyanates, tolylene diisocyanates, chlorophenylene diisocyanates, diphenylmethane - 4,4' - diisocyanate, naphthalene-1,5 - diisocyanate, triphenylmethane - 4,4',4" - triisocyanate, and isopropylbenzene-alpha-4-diisocyanate. Further included among the isocyanates useful in this invention are dimers and trimers of isocyanates and diisocyanates and polymeric diisocyanates such as those having the general formula:

$$[Q(NCO)_i]_j$$

in which $i$ and $j$ are integers of two or more, as well as (as additional components in the reaction mixtures) compounds of the general formula:

$$L(NCO)_i$$

in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing a =Si—NCO group, isocyanates derived from sulfonamides ($QSO_2NCO$), cyanic acid, thiocyanic acid, and compounds containing a metal —NCO radical such as tributyltin isocyanate.

The polyisocyanates are preferably employed in this invention in amounts that provide from 90% to 110% of the stoichiometric amount of isocyanato groups required to react with all of the hydroxyl groups of the polyester and with any water present as a blowing agent.

The blowing agents employed in this invention include methylene chloride, water, liquefied gases which have boiling points below 80° F. and above −60° F., or by other inert gases such as nitrogen, carbon dioxide, methane, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1-chloro-1-fluoroethane, 1-chloro-1,1-difluoro, 2,2-dichloroethane, and 1,1,1-trifluoro, 2-chloro-2-fluoro, 3,3-difluoro-4,4,4-trifluorobutane. The amount of blowing agent used will vary with density desired in the foamed product. Usually from 2 to 15 parts by weight of the blowing agent per 100 parts by weight of the polyester are preferred.

Other additional ingredients can be employed in minor amounts in producing polyester urethane foams in accordance with the process of this invention if desired for specific purposes. Thus, inhibitors (e.g., d-tartaric acid and tertiary-butyl pyrocatechol, "Ionol") can be employed to reduce any tendency of the foam to hydrolytic or oxidative instability. Compounds containing both secondary and tertiary hydroxyl groups, such as "hexylene glycol" (i.e., 2-methyl-2,4-pentanediol), can be used to further reduce compression set and to solubilize amine catalysts. Fatty acid, such as those in tall oil (a by-product from the digestive process of fine wood chips composed of fatty acids, rosin-acids and polymerized, unsaponifiable hydrocarbons), can be employed to solubilize insoluble amine catalysts. Paraffin oil can be added to regulate cell structure so as to coarsen cells and thereby further reduce the tendency of the foam to split. Other additives that can be employed are dyes or pigment and anti-yellowing agents.

It is often convenient to provide premixtures of the anionic organic surfactant and the block copolymer surfactant which can be used to produce a foam when desired. Such premixtures can also contain inhibitors, solubilizers, compression set additives, etc.

In accordance with this invention, flexible polyester urethane foams are produced by a one-step or one-shot technique wherein all of the reactants are reacted simultaneously with the foaming operation. The foaming and the urethane-forming reaction occur without the application of external heat. Thereafter, the foam can be heated (further cured) at 110° F. to 140° F. for 10 to 20 minutes to eliminate any surface tackiness if desired.

The relative amounts of the various components reacted in accordance with the above-described process for producing flexible polyester urethane foams in accordance with this invention are not narrowly critical. The polyester and the polyisocyanate are present in the foam formulations used to produce such foams in a major amount. The relative amounts of these two components is the amount required to produce the urethane structure of the foam and such relative amounts are well known in the art. The blowing agent, catalyst and surfactants are each present in a minor amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the surfactants are present in a foam-stabilizing amount (i.e., in amount sufficient to stabilize the foam). The mixture ratio of anionic organic surfactant to siloxane-oxyalkylene block copolymer may range from about 1.7–66.7 percent by weight of anionic organic surfactant to about 33.3–98.3 percent by weight of siloxane-oxyalkylene block copolymer. Preferred amounts of these various components are given hereinabove.

The low and high density flexible polyester urethane foams produced in accordance with this invention have improved cell structure i.e., the cells are fine and uniform (i.e., these foams generally have from 25 to 40 to 70 cells per inch). The high density foams are also improved since they do not undergo undesirable shrinkage. In general, the foams are not particularly sensitive to stress during production and so imperfections, such as side splits, are reduced. Equally outstanding foams are not achieved when foams are produced with only the anionic organic surfactants or only the block copolymer surfactants, although such surfactants alone do stabilize polyester urethane foams. Similarly poorer results are attained with block copolymers of different molecular weights, siloxane contents or oxyethylene contents than those set forth above for the copolymer surfactants used in this invention.

The flexible polyester urethane foams produced in accordance with this invention can be used in the same areas and for the same purpose as conventional flexible polyester urethane foams (e.g., they can be used as cushioning materials for seating or for packaging delicate objects, as gasketing material and as textile interliners having densities from 1.4 to 1.6 pounds per cubic foot).

The following examples illustrate the present invention.

For the sake of brevity, the following designations are used to denote various compositions employed in the examples.

| Designation | Composition |
| --- | --- |
| Conventional organic surfactant (emulsifiers): | |
| E1 | This is a reaction product of oleic acid and diethyl amine. E1 is sold under the name "Mobay A-3". |
| E2 | This is a sulfated or sulfonated ester produced by reacting propylene oxide and ethylene oxide with a fatty acid to produce an ester and then sulfating or sulfonating the ester. E2 is sold under the name of "Witco Fomrez 77-86". |
| E3 | $C_6H_5CH_2C_6H_4C_6H_4O(CH_2CH_2O)_{13}H$. E3 is sold under the name "Bayer WM". |
| E4 | 50 weight percent aqueous solution of a sulfonated ricinoleic acid. E4 is sold under the name "Bayer SM". |
| E5 | Sodium salt of sulfonated ricinoleic acid. E5 is sold under the name "Bayer SM". |
| E6 | 50 weight percent aqueous solution of a mixture of 70 wt. percent E3 and 30 wt. percent hexamethylene tetramine. E6 is sold under the name "Bayer RM". |

| Designation | Composition |
| --- | --- |
| Siloxane-oxyalkylene copolymer surfactants:[1] | General formula: $Me(OC_2H_4)_{7.2}OC_3H_6$ $Me_3SiO(Me_2SiO)_m[SiO]_nSiMe_3$ (with Me substituent) |
| Siloxane I | m=5.1, n=7.5 |
| Siloxane II | m=0, n=7.9 |
| Siloxane III | m=16.5, n=5.7 |
| Siloxane IV | m=0, n=1 |
| Siloxane V | m=70, n=24.5 |
| Siloxane VI | m=0, n=36 |

[1] "Me" denotes the methyl group.

| | |
| --- | --- |
| Organic surfactant: | |
| Sulfonate I | This is an anionic surfactant used in this invention. It is a sodium sulfonate of a petroleum hydrocarbon mixture and has an average molecular weight of 435. It has the following properties: Typical analysis (Bryton 430): Sodium sulfonate, wt. percent =62.0. Inorganic salt=0.7. Mineral oil, wt. percent=32.7. Water, wt. percent=4.5. Isopropyl alcohol=None. Alkalinity as $Na_2CO_3$=0.1. Alkalinity as NaOH=None. Color, ASTM Dil=4½. Molecular weight [1]=435. Solubilities: Mineral oil—Soluble. Petroleum solvent—Soluble. Isopropyl alcohol—Soluble. Carbon tetrachloride—Soluble. Water—Dispersible. Typical physical properties: Flash point, C.O.C., °F.=400. Pounds/gallon=8.50. Viscosity at 210° F. SUS=1,400. Pumping temp., °F.=180. |
| Surfactant II | This is an anionic organic surfactant used in this invention. It is the sodium salt of mixed mono- and di-phosphate esters of polyoxyethylenated nonylphenols containing 2 to 10 oxyethylene units per molecule. Surfactant II is sold under the name "Gafac LO-529". |
| Surfactant III | This is an anionic organic surfactant used in this invention. It is methyl naphthalene sodium sulfonate. Surfactant III is sold under the name "Petro AA". |
| Surfactant IV | This is a sulfated or sulfonated ester produced by reacting propylene oxide and ethylene oxide with a fatty acid to produce an ester and then sulfating or sulfonating the ester. Surfactant IV is sold under the name of "Witco Fomrez 77-86". |
| Surfactant V | This is an anionic surfactant used in this invention. It is a mixture of polyoxyethylenated nonylphenyl mono- and di-phosphoric acids, containing from 2 to 10 oxyethylene units per molecule. Surfactant V is sold under the name "Gafac PE 510". |

[1] Pertains to the sulfonate portion of the products.
NOTE.—Sulfonate I is sold under the name "Bryton 430".

| | |
| --- | --- |
| Pre-mixture of sulfonic and block copolymer surfactants: | |
| Pre-mixture I | This is a mixture containing a combination of surfactants in accordance with this invention as well as three optional additives. The mixture contains: (1) Siloxane I, wt. percent=35. (2) Sulfonate I, wt. percent=35. (3) Tall oil, wt. percent=15. (4) Hexylene glycol, wt. percent=15. (5) Ionol=2,500 parts by wt. per million parts by wt. of (1) to (4). |
| Polyester resin: | |
| Polyester I | This is a commercially available polyester resin used in producing flexible polyester urethane foams. It is produced from adipic acid, diethylene glycol and trimethylol propane in a mole ratio of approximately 1:1:0.2. Polyester I has a hydroxyl number of about 50 to 56, a molecular weight of about 2,000, an acid number not greater than 2 and a viscosity of about 17,000 centistokes at about 25° C. Polyester I is sold under the name "Witco Fomrez No. 50". |
| Polyester II | This is a commercially available polyester resin used in producing flexible polyester urethane foams. It is produced from adipic acid, diethylene glycol and a minor amount of a trihydric alcohol. It has a hydroxyl number of 60±3 and a hydroxyl content of 1.7 to 1.9 wt. percent. It has a viscosity from 925 to 1,071 centipoises at 75° C. Polyester II is sold under the name "Desmophen 2200". |

For the sake of brevity, the following abbreviations and terms are used to describe the quality of the foams produced in the examples:

"Parts" denotes parts by weight unless otherwise stated.

"BS" is used as an abbreviation for "Buckshot." Buckshot is a term given to denote an imperfection in polyurethane foams, specifically a plurality of small approximately spherical voids in the foam.

"CPI" is used for "cells per inch." This denotes the number of cells per linear inch of the foam. It is proportional to the fineness of the cell structure.

"Rise" denotes the foam height.

The foam formulations employed in producing the foams in the examples appearing below were prepared in the following manner: The polyester was weighed in a tared container (a 500-milliliter beaker). The surfactant(s), amine catalysts, and water were mixed in a 4-ounce jar. The contents of the jar were then mixed with the polyester using a spatula. Further mixing was done in a drill press equipped with two three-bladed marine-type propellers about two inches in diameter and having a 45° pitch. The mixing in the drill press was accomplished at 1000 revolutions per minute for 8 seconds. Then a mixture of diisocyanates was added. The reaction mixture so produced was mixed for 5 seconds and poured into a 165-ounce container (a No. 10 "Lilly Tub"). Unless otherwise noted, the amount of diisocyanates used was 105% of the stoichiometric amount required to react with the polyester and water present in the reaction mixture (i.e., "105 index"). In all cases, the foam formulations (reaction mixtures) foamed and reacted spontaneously and simultaneously. Thereafter, the foams were further cured for 30 minutes at 130° C. Finally, the properties of the foam shown below were observed.

EXAMPLE I

Using the above-described procedure, three foams (Foams I, II and III) were produced in accordance with this invention using, in combination, a sulfonic surfactant and a block copolymer surfactant (Pre-mixture I). For purposes of comparison, three additional foams (Foams IV, V and VI) were produced in the same manner using, as the surfactants, two conventional organic emulsifiers (E1 and E2) in place of Pre-mixture I. The components used in producing these foams are indicated below:

| Components | Amounts of components (parts by weight) | | | | | |
|---|---|---|---|---|---|---|
| | Foam I (High density) | Foam II (Medium density) | Foam III (Low density) | Foam IV (High density) | Foam V (Medium density) | Foam VI (Low density) |
| Polyester I | 100 | 100 | 100 | 100 | 100 | 100 |
| N-ethylmorpholine | 1.0 | 1.9 | 1.9 | 1.0 | 1.90 | 1.90 |
| Hexadecyl dimethylamine | 0.3 | 0.3 | 0.3 | 0.3 | 0.3 | 0.3 |
| Water | 1.5 | 3.6 | 5.0 | 1.5 | 3.6 | 5.0 |
| Mixture of 80 wt. percent 2,4-tolylene diisocyanate and 20 wt. percent 2,6-tolylene diisocyanate | 105 index in all cases | | | | | |
| Pre-mixture I | 1.0 | 1.0 | 1.0 | | | |
| Organic emulsifier (E1) | | | | 1.4 | 1.4 | 1.4 |
| Organic emulsifier (E2) | | | | 1.3 | 1.3 | 1.3 |

In all cases, clear solutions were obtained when the water, amines and Pre-mixture I were mixed.

Foams I and VI had the following properties.

| Foams | I | II | III | IV | V | VI |
|---|---|---|---|---|---|---|
| Properties: | | | | | | |
| Rise | 2.0 | 5.2 | 7.0 | 1.9 | 4.4 | 6.2 |
| CPI | 55–60 | 40–45 | 25–30 | 20–25 | 30–35 | (9) |
| Density (lbs./ft.³) | 4.2 | 1.9 | 1.42 | | 2.4 | 1.9 |
| BS | (1) | (1) | (1) | (4) | (1) | (7) |
| Other | (3) | (2) | (2) | (4) | (6) | (8) |

[1] Moderate.
[2] Good resilience.
[3] Fair to good uniformity and some entrained air.
[4] Moderate to severe.
[5] Foam shrank slightly.
[6] Some entrained air.
[7] Very severe.
[8] Poor uniformity.
[9] Sponge structure.

As further comparisons, three foams (Foams VII, VIII and IX) were produced using a block copolymer (Siloxane I) as the only surfactant and three additional foams (Foams X, XI and XII) were produced using a sulfonate (Sulfonate I) as the only surfactant. The components used in producing these foams were indicated below:

Foams VII to XII had the following properties:

| Foams | VII | VIII | IX | X | XI | XII |
|---|---|---|---|---|---|---|
| Properties: | | | | | | |
| Rise | 1.7 | 4.9 | 7.0 | 1.3 | 5.3 | 5.3 |
| CPI | 45–50 | 30–35 | (*) | 45–50 | 30–35 | 10–15 |
| BS | (1) | (1) | | (1) | (1) | |
| Other | (2 6) | (2 3 6) | (4 6) | (5) | (4) | |

[1] Moderate.
[2] Some settling.
[3] "Dead" foam and some entrained air.
[4] Some very coarse cells near surface.
[5] Foam shrank.
[6] High compression set.
* 50% 1–5 and 50% 20-25.

The above results show the improved foams produced using the surfactant combination of this invention as compared to other surfactant systems.

EXAMPLE II

As in Example I, three foams (Foams XIII, XIV and XV) were produced in accordance with this invention and, for purpose of comparison, nine other foams were produced using conventional organic emulsifiers (Foams XVI, XVII and XVIII) or only block copolymer surfactants (Foams XIX, XX and XXI) or only sulfonic surfactants (Foams XXII, XXIII and XXIV). The polyester resin amine catalyst and conventional organic emulsifiers used differed from those used in Example I. The components used in producing these foams are indicated below:

| Components | Amounts of components (parts by weight) | | | | | |
|---|---|---|---|---|---|---|
| | Foam XIII (High density) | Foam XIV (Medium density) | Foam XV (Low density) | Foam XVI (High density) | Foam XVII (Medium density) | Foam XVIII (Low density) |
| Polyester II | 100 | 100 | 100 | 100 | 100 | 100 |
| C₅H₅CH₂N(CH₃)₂ cat | 1.0 | 1.2 | 1.6 | 1.0 | 1.2 | 1.6 |
| Organic emulsifier: | | | | | | |
| E3 | | | | 1.0 | 1.5 | 1.2 |
| E4 | | | | 0.6 | 3.0 | 3.0 |
| E6 | | | | | | 0.3 |
| Water | 1.50 | 3.50 | 5.05 | 1.2 | 3.0 | 3.4 |
| Paraffin oil | | | | 0.2 | 0.1 | 0.1 |
| Pre-mixture I | 1.0 | 1.0 | 1.0 | | | |
| Mixture of 65 wt.-percent 2,4-tolylene diisocyanate and 35 wt.-percent 2,6-tolylene diisocyanate | 25 | 21 | 29 | 25 | 21.0 | 29.0 |
| Mixture of 30 wt.-percent 2,4-tolylene diisocyanate and 20 wt.-percent 2,6-tolylene diisocyanate | | 21 | 29 | | 21.0 | 29.0 |

| Components | Amounts of components (parts by weight) | | | | | |
|---|---|---|---|---|---|---|
| | Foam VII (High density) | Foam VIII (Medium density) | Foam IX (Low density) | Foam X (High density) | Foam XI (Medium density) | Foam XII (Low density) |
| Polyester I | 100 | 100 | 100 | 100 | 100 | 100 |
| N-ethylmorpholine | 1.0 | 1.9 | 1.9 | 1.0 | 1.9 | 1.9 |
| Hexadecyl dimethylamine | 0.3 | 0.3 | 0.3 | 0.3 | 0.3 | 0.3 |
| Water | 1.5 | 3.6 | 5.0 | 1.5 | 3.6 | 5.0 |
| Mixture of 80 wt.-percent 2,4-tolylene diisocyanate and 20 wt.-percent 2,6-tolylene diisocyanate | 105 index in all cases | | | | | |
| Siloxane I | 0.35 | 0.35 | 0.35 | | | |
| Sulfonate I | | | | 0.35 | 0.35 | 0.35 |

| Components | Amounts of components (parts by weight) | | | | | |
|---|---|---|---|---|---|---|
| | Foam XIX (High density) | Foam XX (Medium density) | Foam XXI (Low density) | Foam XXII (High density) | Foam XXIII (Medium density) | Foam XXIV (Low density) |
| Polyester II | 100 | 100 | 100 | 100 | 100 | 100 |
| $C_6H_5CH_2N(CH_3)_2$ cat | 1.0 | 1.2 | 1.6 | 1.0 | 1.2 | 1.6 |
| Water | 1.5 | 3.5 | 5.05 | 1.5 | 3.5 | 5.05 |
| Mixture of 65 wt.-percent 2,4-tolylene diisocyanate and 35 wt.-percent 2,6-tolylene diisocyanate | 25 | 21 | 29 | 25 | 21 | 29 |
| Mixture of 80 wt.-percent 2,4-tolylene diisocyanate and 20 wt.-percent 2,6-tolylene diisocyanate | | 21 | 29 | | 21 | 29 |
| Siloxane I | 0.35 | 0.35 | 0.35 | | | |
| Sulfonate I | | | | 0.35 | 0.35 | 0.35 |

Foams XIII to XXIV had the following properties:

| Foams | XIII | XIV | XV | XVI | XVII | XVIII |
|---|---|---|---|---|---|---|
| Properties: | | | | | | |
| Rise | 1.7 | 4.7 | 6.7 | 1.5 | 4.3 | 6.0. |
| CPI | 45–50 | 40–45 | 25–30 | 40–45 | 25–30 | 5–10. |
| Other | Trace buckshot, good resilience, one air flaw near bottom of bun. | Moderate buckshot, good resilience. | Moderate buckshot, good resilience. | Moderate buckshot, slight shrinkage near the surface of the bun. | Moderate buckshot, some shrinkage, basal split. | Very coarse, irregular cell structure, shrinkage on surface. |

| Foams | XIX | XX | XXI | XXII | XXIII | XXIV |
|---|---|---|---|---|---|---|
| Properties: | | | | | | |
| Rise | 1.5 | 4.0 | 6.6 | 1.6 | 4.0 | 5.5. |
| CPI | 45–50 | 35–40 | 20–25 | 30–35 | 25–30 | 20–25. |
| Other | Moderate buckshot, slight settling, high compression set. | Moderate buckshot, surface blister, settling, high compression set. | Severe buckshot, very poor cell structure high compression set. | Moderate buckshot, small split, near outer edge entrained. | Moderate-severe buckshot splits through center. | Severe buckshot, sponge-like structure, very poor foam. |

The above results show the improved foams produced using the surfactant combinations of this invention as compared to other surfactant systems.

EXAMPLE III

Six foams were produced using the components and amounts of components used in producing Foam II in Example I with the modification that, in five of the foams, block copolymers other than Siloxane I were used. The block copolymers used differed in molecular weight and in siloxane content and this example illustrates the importance of these variables. The following results were obtained:

SILOXANES

| Siloxane | II [a] | I [a] | III [b] | IV [a] | V [b] | VI [a] |
|---|---|---|---|---|---|---|
| Molecular weight | 3,678 | 4,000 | 3,960 | 612 | 16,900 | 16,800 |
| Wt.-percent siloxane in block copolymer | 14.0 | 25.0 | 42.0 | 37 | 42.0 | 14.0 |

[a] Copolymers useful in this invention.
[b] Copolymers not useful in this invention.

FOAM PROPERTIES

| | Foam from siloxane | | | | | |
|---|---|---|---|---|---|---|
| | II [a] | I [a] | III [b] | IV [a] | V [b] | VI [a] |
| Properties: | | | | | | |
| Rise | 5.2 | 5.2 | 5.5 | 5.2 | | 4.9 |
| CPI | 30–35 | 40–45 | 15–20 | 40–45 | | 20–25 |
| Other | (1) | | (2) | (3) | (4) | |

[a] Satisfactory foam.
[b] Unsatisfactory foam.
1 Slight shrinkage.
2 Very coarse, irregular cell structure.
3 Tight foam.
4 Foam boiled.

EXAMPLE IV

When benzene sulfonic acid or toluene sulfonic acid was employed in combination with a block copolymer surfactant useful in this invention (Siloxane I) to produce a polyester urethane foam, a satisfactory foam was not produced due to excessive compression set. This illustrates the importance of the surface tension lowering limitation on the anionic organic surfactants useful in this invention (neither benzene nor toluene sulfonic acid lowers the surface tension of polyester resins).

EXAMPLE V

When dodecyl phenyl sulfonic acid is substituted for sulfonate I in Pre-mixture I in the reaction mixture used to produce Foam III of Example I, a good foam is produced using the general procedure described above.

EXAMPLE VI

Using the above-described general procedure, five low density foams (Foams XXV to XXIX) were produced from 100 parts Polyester I, 1.0 part N-ethylmorpholine, 0.3 part hexadecyl dimethylamine, 5 parts water, 45.2 parts of a mixture of 80 wt. percent 2,4-tolylene diisocyanate and 20 wt. percent 2,6-tolylene diisocyanate and the indicated surfactant(s):

| Foam | Surfactant(s) (parts by wt.) | Rise | Other foam properties |
|---|---|---|---|
| XXV | Surfactant II (0.45) | 5.9 | Large void. |
| XXVI | Surfactant II (0.45) / Siloxane I (0.45) | 6.4 | No voids or splits. |
| XXVII | Surfactant III (0.45) | | Foam collapsed. |
| XXVIII | Surfactant III (0.45) / Siloxane I (0.45) | 6.9 | No voids or splits. |
| XXIX | Siloxane I (0.45) | | Foam collapsed. |

Foams with large voids or splits are virtually useless. As shown above, anionic organic surfactants used alone resulted either in no foam (collapse) or in foams that contained large voids while the foams made with the anionic organic surfactant-silicone surfactant combinations of this invention were free of these defects.

EXAMPLE VII

Pre-mixture I, Siloxane I, and the organic surfactants listed below were dissolved in Polyester I at room temperature and the surface tension of Polyester I was thereby lowered as indicated below:

| Surfactant(s) | | Surface tension (dynes/cm.) |
|---|---|---|
| Type | Concentration [1] | |
| None | | 48.8 |
| Pre-mixture I | 1.0 | 26.6 |
| Siloxane I | 0.35 | 26.7 |
| Sulfonate I | 0.348 | 36.0 |
| Surfactant II | 0.394 | 36.9 |
| Surfactant V | 0.348 | 38.2 |

[1] Parts by weight per 100 parts by weight of polyester I.

The above surface tensions were measured using a DuNouy surface tensiometer.

What is claimed is:
1. A process for producing a flexible polyester urethane foam, said process comprising foaming and reacting in a single step a reaction mixture comprising:
   (I) a polyester resin having an average of at least two hydroxyl groups per molecule and having a hydroxyl number of from 45 to 150;
   (II) a polyisocyanate, said polyester and said polyisocyanate, taken together, being present in the mixture in a major amount and in the relative amount required to produce the urethane;
   (III) a blowing agent in a minor amount sufficient to foam the reaction mixture;
   (IV) a catalytic amount of a catalyst for the production of the urethane from the polyester and the polyisocyanate;
   (V) a minor amount of an anionic organic surfactant stabilizer for the foam which is soluble in said polyester resin at room temperature, said organic surfactant having at least one hydrocarbon group that contains at least 10 carbon atoms and has at least one ammonium or alkali metal sulfate or sulfonate, sulfonic acid, phosphate, persulfate, thiosulfate or sulfonamido group, and which is capable of lowering the surface tension of said polyester resin at least 4 dynes per centimeter when dissolved therein; and
   (VI) a minor amount of a siloxane-polyoxyalkylene block copolymer surfactant stabilizer for the foam having molecular weight from 600 to 17,000 a siloxane content from 14 to 40 weight percent based on the weight of the copolymer and an oxyethylene content of at least 75 weight percent based on the total amount of oxyalkylene groups in the copolymer.

2. The process of claim 1 wherein the anionic organic surfactant defined in part (V) is a liquid, water-insoluble organic compound having at least 18 carbon atoms and at least one carbon-bonded sulfonic acid group represented by the formula:

$$-SO_3H$$

or at least one ammonium, alkali metal or alkaline earth metal salt group derived from said sulfonic acid group.

3. The process of claim 2 wherein the anionic organic surfactant is a liquid, water-insoluble organic compound having the formula:

$$[R°SO_3]_mM$$

wherein R° is a monovalent hydrocarbon group having at least 18 carbon atoms, M is a cation selected from the group consisting of the hydrogen, $NR°°_4$, alkali metal and alkaline earth metal cations, R°° is hydrogen or a monovalent hydrocarbon group, and $m$ is the valence of the cation represented by M.

4. The process of claim 1 wherein the anionic organic surfactant is an alkali metal sulfate or sulfonate.

5. The process of claim 1 wherein the anionic surfactant is an ammonium sulfate or sulfonate.

6. The process of claim 1 wherein the anionic surfactant is a sulfonic acid.

7. The process of claim 1 wherein the anionic organic surfactant is soluble in the polyester resin to the extent of at least 0.1 part by weight for 100 parts by weight of the polyester resin and is capable of lowering the surface tension of the polyester resin at least 10 dynes per centimeter when dissolved in the resin in an amount from 0.1 part by weight up to the maximum solubility concentration of the surfactant in the resin.

8. The process of claim 1 wherein the anionic organic surfactant has the formula:

$$alkyl—Ar—SO_3NR_4°°$$

wherein alkyl represents an alkyl group having at least 11 carbon atoms, Ar is an arylene group and R°° is hydrogen or a monovalent hydrocarbon group.

9. The process of claim 1 wherein the blowing agent is water.

10. The process of claim 1 wherein the blowing agent is present in an amount sufficient to produce a low density foam having a density from 1.4 to 1.6 pounds per cubic foot.

11. The process of claim 1 wherein the siloxane-polyoxyalkylene block copolymer surfactant has the formula:

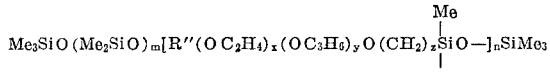

$$Me_3SiO(Me_2SiO)_m[R''(OC_2H_4)_x(OC_3H_6)_yO(CH_2)_z\overset{Me}{\underset{|}{Si}}O-]_nSiMe_3$$

wherein $m$ has a value from 0 to 20 inclusive, $n$ has a value from 1 to 10 inclusive, $x$ has a value from at least 4, $y$ has a value from 0 to 6 inclusive, $z$ has a value from 2 to 3 inclusive and R'' is an alkyl group containing from 1 to 4 carbon atoms inclusive and "Me" is a methyl group ($CH_3$).

12. The process of claim 1 wherein the sulfonic surfactant is a liquid, water-insoluble organic compound having the formula $$[R°SO_3]_mM$$

wherein R° is a monovalent hydrocarbon group having at least 18 carbon atoms, M is a cation selected from the group consisting of the hydrogen, $NR°°_4$, alkali metal and alkaline earth metal cations, R°° is hydrogen or a monovalent hydrocarbon group, and $m$ is the valence of the cation represented by M and wherein the block copolymer surfactant has the formula:

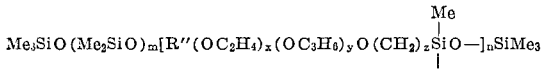

$$Me_3SiO(Me_2SiO)_m[R''(OC_2H_4)_x(OC_3H_6)_yO(CH_2)_z\overset{Me}{\underset{|}{Si}}O-]_nSiMe_3$$

wherein $m$ has a value from 0 to 20 inclusive, $n$ has a value from 2 to 10 inclusive, $x$ has a value of from at least 4, $y$ has a value from 0 to 6 inclusive, $z$ has a value from 2 to 3 inclusive and R'' is an alkyl group containing from 1 to 4 carbon atoms inclusive and "Me" is a methyl group ($CH_3$).

13. A process for producing a flexible polyester urethane foam, said process comprising foaming and reacting in a single step a reaction mixture of:
   (I) a polyester resin having an average of at least 2 hydroxyl groups per molecule, having a hydroxyl number of from 45 to 150, and having no carbon to carbon aliphatic multiple bonds;
   (II) a tolylene diisocyanate, said polyester and said diisocyanate taken together being present in the mixture in a major amount and in the relative amount required to produce the urethane;
   (III) water in a minor amount sufficient to foam the reaction mixture;
   (IV) a catalytic amount of an amine catalyst for the production of the urethane from the polyester and the polyisocyanate;
   (V) a minor amount of a liquid, water-insoluble sulfonic surfactant stabilizer for the foam which is a mixture of compounds each having the formula:

$$[R°SO_3]_mM$$

wherein R° is a monovalent hydrocarbon group having at least 18 carbon atoms, M is an alkali metal cation, and $m$ is one; and
   (VI) a minor amount of a siloxane-polyoxyalkylene block copolymer surfactant stabilizer for the foam having molecular weight from 3000 to 4000, a siloxane content from 23 to 27 weight percent based on the weight of the copolymer and an oxyethylene content of at least 75 weight percent based on the total amount of oxyalkylene groups in the copolymer, said block copolymer having the formula:

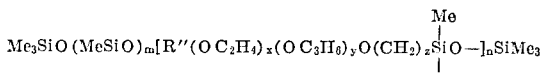

$$Me_3SiO(MeSiO)_m[R''(OC_2H_4)_x(OC_3H_6)_yO(CH_2)_z\overset{Me}{\underset{|}{Si}}O-]_nSiMe_3$$

wherein m has a value from 0 to 20 inclusive, $n$ has a value from 1 to 10 inclusive, $x$ has a value of from at least 4, $y$ has a value from 0 to 6 inclusive, $z$ has a value from 2 to 3 inclusive and R" is an alkyl group containing from 1 to 4 carbon atoms inclusive and "Me" is a methyl group ($CH_3$).

14. A mixture suitable for use in producing a flexible polyester urethane foam, said mixture consisting essentially of an anionic organic surfactant as defined in part (V) of claim 1 and a block copolymer as defined in part (VI) of claim 1, wherein the amount of anionic organic surfactant to block copolymer ranges from about 1.7–66.7 percent by weight of anionic organic surfactant to about 33.3–98.3 percent by weight of block copolymer.

15. A mixture as defined in claim 14 wherein the anionic organic surfactant is a sulfonic surfactant which is a liquid, water-insoluble organic compound having the formula:

$$[R°SO_3]_m M$$

wherein R° is a monovalent hydrocarbon group having at least 18 carbon atoms, M is a cation selected from the group consisting of the hydrogen $NR°°_4$, alkali metal and alkaline earth metal cations, R°° is hydrogen or a monovalent hydrocarbon group, and $m$ is a valence of the cation represented by M; and the block copolymer is a siloxane-polyoxyalkylene block copolymer surfactant having a molecular weight from 600 to 17,000, a siloxane content from 14 to 40 weight percent based on the weight of the copolymer and an oxyethylene content of at least 75 weight percent based on the total amount of oxyalkylene groups in the copolymer, said copolymer surfactant having the formula:

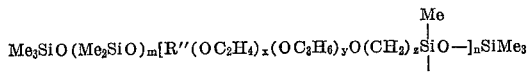

wherein $m$ has a value from 0 to 20 inclusive, $n$ has a value from 1 to 10 inclusive, $x$ has a value of from at least 4, $y$ has a value from 0 to 6 inclusive, $z$ has a value from 2 to 3 inclusive, and R" is an alkyl group containing from 1 to 4 carbon atoms inclusive and "Me" is a methyl group ($CH_3$).

16. A mixture as defined in claim 14 wherein the block copolymer has the formula:

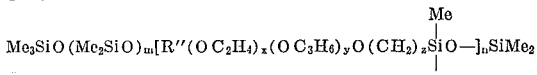

wherein $m$ has a value from 0 to 20 inclusive, $n$ has a value from 1 to 10 inclusive, $x$ has a value of from at least 4, $y$ has a value from 0 to 6 inclusive, $z$ has a value from 2 to 3 inclusive and R" is an alkyl group containing from 1 to 4 carbon atoms inclusive and "Me" is a methyl group ($CH_3$).

17. A mixture as defined in claim 14 wherein the anionic organic surfactant and block copolymer are present in substantially equal amounts.

18. A mixture as defined in claim 15, wherein the anionic surfactant and block copolymer are present in substantially equal amounts.

19. A mixture as defined in claim 16, wherein the anionic surfactant and block copolymer are present in substantially equal amounts.

References Cited

UNITED STATES PATENTS

| | | | |
|---|---|---|---|
| 2,932,621 | 4/1960 | Terry. | |
| 2,938,005 | 5/1960 | Bick et al. | 260—2.5 |
| 3,125,542 | 3/1964 | Haines. | |
| 3,398,104 | 8/1968 | Haluska | 260—2.5 |

FOREIGN PATENTS

| | | |
|---|---|---|
| 1,291,821 | 3/1962 | France. |

OTHER REFERENCES

Saunders et al.: "Polyurethanes," Chemistry & Technology, Part II, pp. 51–59 © 1964, Interscience Publishers, New York.

Journal of Cellular Plastics, vol. 2, No. 1, p. 1 (January 1966).

DONALD E. CZAJA, Primary Examiner

H. S. COCKERAM, Assistant Examiner

U.S. Cl. X.R.

252—351

PO-1050
(5/69)

UNITED STATES PATENT OFFICE
CERTIFICATE OF CORRECTION

Patent No. 3,594,334        Dated July 20, 1967

Inventor(s) Lawrence Marlin

It is certified that error appears in the above-identified patent and that said Letters Patent are hereby corrected as shown below:

Column 9, line 3 that portion of the formula shown as "(x" should read --- )x ---.

Column 9, line 3 that portion of the formula shown as "SoO" should read --- SiO ---.

Column 19 line 26 (i.e. claim 1, last line of part "(V)") cancel the number "4" and insert --- 5 ---.

Signed and sealed this 21st day of December 1971.

(SEAL)
Attest:

EDWARD M. FLETCHER, JR.
Attesting Officer

ROBERT GOTTSCHALK
Acting Commissioner of Patents